(12) United States Patent
Lavigne

(10) Patent No.: US 7,510,649 B1
(45) Date of Patent: Mar. 31, 2009

(54) TOP LOADING VERTICAL FLOW SUBMERGED BED WASTEWATER TREATMENT SYSTEM

(76) Inventor: Ronald Lavigne, P.O. Box 518, Leeds, MA (US) 01053

( * ) Notice: Subject to any disclaimer, the term of this patent is extended or adjusted under 35 U.S.C. 154(b) by 70 days.

(21) Appl. No.: 11/030,828

(22) Filed: Jan. 7, 2005

Related U.S. Application Data

(60) Provisional application No. 60/535,605, filed on Jan. 9, 2004.

(51) Int. Cl.
   *C02F 3/32* (2006.01)
(52) U.S. Cl. .......... 210/151; 210/170.08; 210/602; 137/883
(58) Field of Classification Search ........ 210/151, 210/150, 170.08, 532.2, 602; 137/395, 883
   See application file for complete search history.

(56) References Cited

U.S. PATENT DOCUMENTS

| | | | | |
|---|---|---|---|---|
| 800,187 A | * | 9/1905 | Venable | 210/150 |
| 968,015 A | * | 8/1910 | Wilkie | 210/151 |
| 1,975,638 A | * | 10/1934 | Girard | 210/151 |
| 3,770,623 A | * | 11/1973 | Seidel | 210/170.08 |
| 4,415,450 A | * | 11/1983 | Wolverton | 210/602 |
| 4,824,572 A | * | 4/1989 | Scott | 210/602 |
| 4,855,040 A | * | 8/1989 | Kickuth | 210/150 |
| 5,049,265 A | * | 9/1991 | Boyd et al. | 210/150 |
| 5,078,882 A | * | 1/1992 | Northrop | 210/602 |
| 6,277,274 B1 | * | 8/2001 | Coffman | 210/150 |
| 6,428,691 B1 | * | 8/2002 | Wofford | 210/151 |
| 6,540,910 B2 | * | 4/2003 | Schwarzenegger et al. | 210/170.08 |

* cited by examiner

*Primary Examiner*—Christopher Upton
(74) *Attorney, Agent, or Firm*—Blodgett & Blodgett, P.C.

(57) ABSTRACT

A system for treating wastewater having a treatment bed of particulate material, inflow distributing plumbing for applying wastewater from a wastewater supply source to upper part of the treatment bed. The wastewater percolates downwardly through the particulate material and is collected by outflow plumbing and conveyed out of the treatment bed. Preferably, the particulate material in the treatment bed is suitable for supporting aquatic plant life.

18 Claims, 5 Drawing Sheets

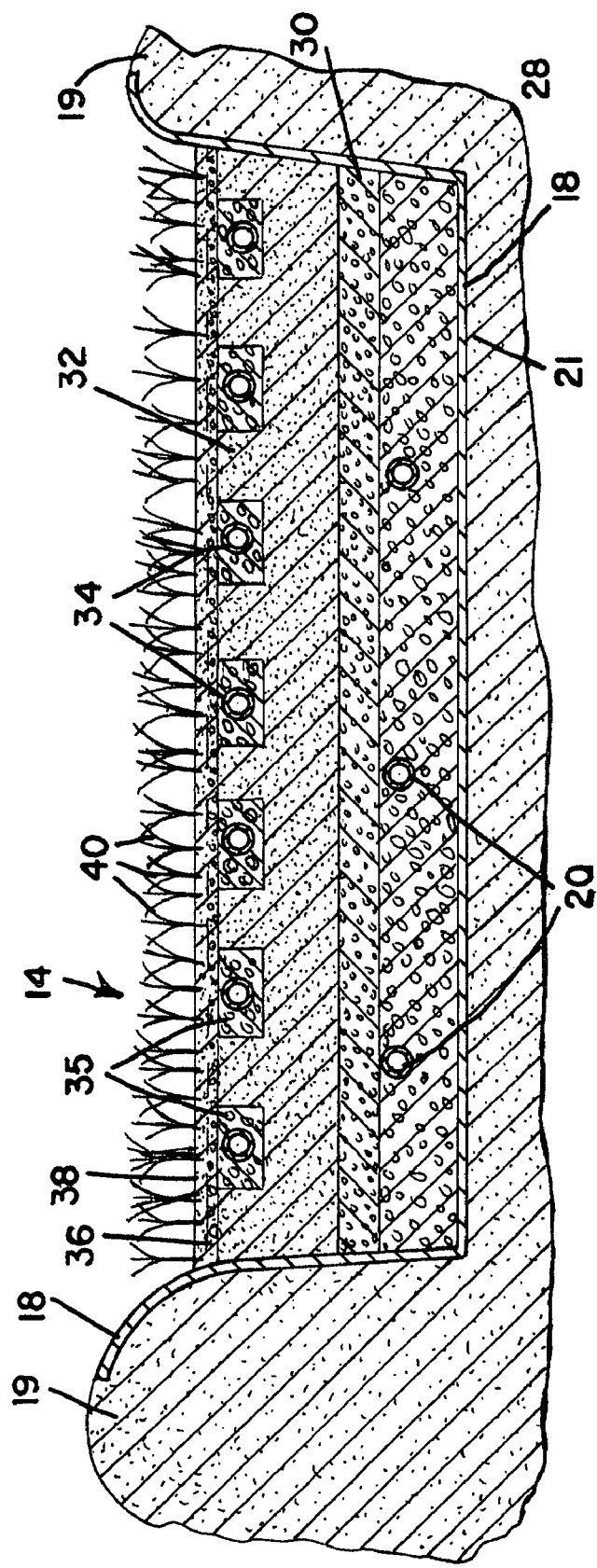
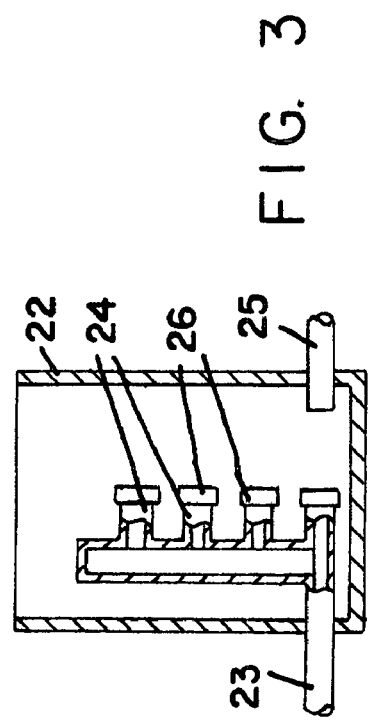
FIG. 2
FIG. 3

TOP LOADING VERTICAL FLOW SUBMERGED BED WASTEWATER TREATMENT SYSTEM

CROSS-REFERENCE TO RELATED APPLICATIONS

This application claims the benefit under 35 U.S.C. §119 (e) of prior U.S. Provisional Application No. 60/535,605 filed Jan. 9, 2004; which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed generally to a system for treating wastewaters such as landfill leachate, hazardous waste, domestic sewage, domestic sludge, industrial sludges, food processing wastewaters, urban runoff, aquaculture wastewaters, and petroleum residuals. The invention is directed more specifically to a wastewater treatment system that employs a physio-chemical, biological apparatus, commonly referred to as "artificial wetland" or "green system". The use of "artificial wetlands" or "green systems" for wastewater treatment has been in practice for a long time. Over the past 50 years a multitude of variations to the technology have evolved. The applicant has obtained several U.S. patents for variation of the above-described technology (i.e., U.S. Pat. Nos. 4,995,969, 4,678,582, 4,368,120, and 4,276,164).

Conventional wastewater treatment systems rely on chemicals, and electrically driven motors and other mechanical apparatus. These elements add considerably to the cost of operating the treatment system.

Conventional wastewater treatment systems are also subject to climatic differences. In northern climates, bacterial action diminishes or ceases when air temperature drop significantly. Also plants used in the treatment systems either die or become dormant when air temperature is at or near freezing.

Another problem encountered in current wastewater treatment systems is that, over time, there is an accumulation of sludge in the flow components of the system which reduces the efficiency of the system and eventually causes the system to clog and fail. Even the most efficient systems fail to treat all of the wastewater.

What is needed is a wastewater treatment system that does not rely on chemicals, motor driven pumps or electric power.

What is also needed is a wastewater treatment system that provides substantially 100% treatment of the wastewater components.

What is further needed is a wastewater treatment system that essentially uses only sunlight and gravity as energy sources and can be used in areas where conventional wastewater treatment is neither possible nor practical.

What is still further needed is a wastewater treatment system that is economical for small as well as large applications.

What is also needed is a wastewater treatment system that biodegrades substantially all of the components in the wastewater, thereby eliminating the need for sludge disposal in landfills the production of effluent that can either be reused or returned to the environment without negative impacts.

BRIEF SUMMARY OF THE INVENTION

In general, the invention utilizes an "engineered" ecological system to treat a wide variety of wastewaters. Specially selected plants and growth mediums provide optimum conditions for aerobic and anaerobic bacterial to metabolize wastewater constituents. Lined basins approximately 1 meter in depth are constructed typically using PVC piping, stone, pea gravel and coarse sand as a growth media. Wastewater is introduced through the distribution network of PVC piping. The rate of percolation through the coarse sand is retarded using a control box. The control box insures an adequate detention time within the treatment unit so that intended physical, chemical and biological processes can occur. The treated effluent is collected by an underdrain system, and discharged into the control box where it can be monitored, and discharged or passed onto another treatment unit. Typically two or more treatment beds are operated in series or parallel to insure adequate detention times. Each treatment unit may utilize the same or different plants and growth mediums depending on design objectives.

Perpetual reed bed cells are seeded with various species of annelids (worms) to consume bio-solids. Hydraulic conductivity through the reed bed cells is maintained by using plants with an adventitious root structure. By combining perpetual reed bed cells with the treatment cells of the present invention, 100% of a wastewater stream can be effectively treated and then reused.

The invention resides in the combination of parts set forth in the specification and covered by the claims appended thereto.

BRIEF DESCRIPTION OF THE DRAWINGS

The character of the invention, however, may best be understood by reference to one of its structural forms, as illustrated by the accompanying drawings, in which:

FIG. 2 is a longitudinal vertical cross section of one of the treatment beds of the present invention;

FIG. 3 is a vertical cross-sectional view of a control box that forms part of the outflow device for the treatment bed;

DETAILED DESCRIPTION OF THE INVENTION

Figure 1:
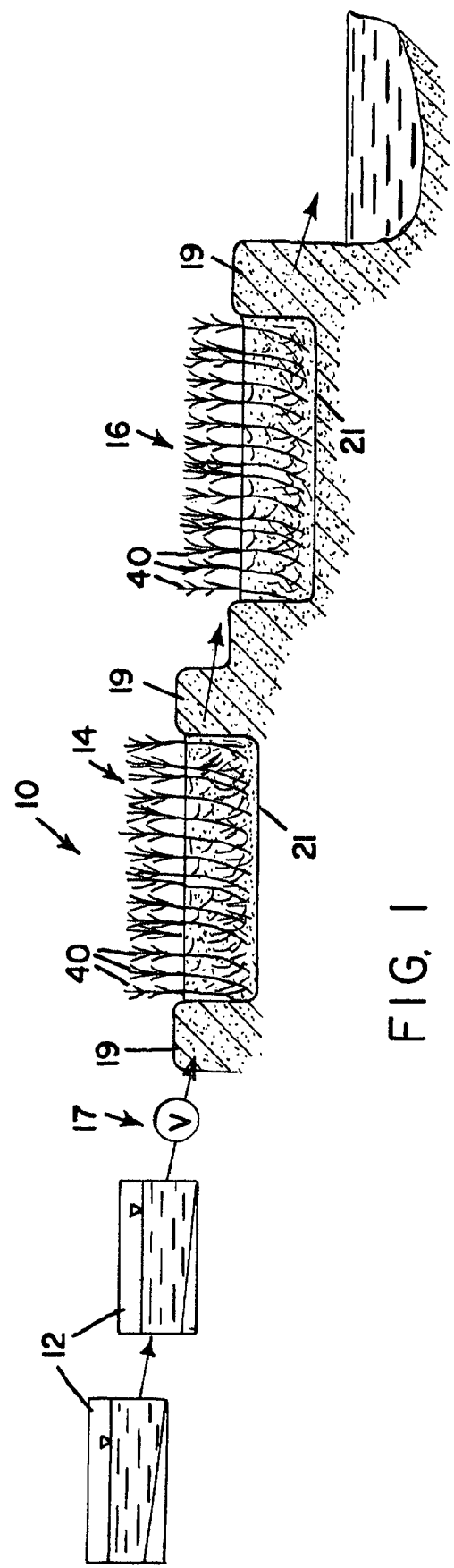
FIG. 1 is a longitudinal vertical cross section of a wastewater treatment system embodying the principles of the present invention.

Referring to FIGS. 1 and 2, the wastewater treatment system of the present invention, generally indicated by the reference numeral 10, is shown as having a wastewater supply source which may be in the form of a settling tank or storage container such as tanks 12. Treatment units or beds, generally indicated by the reference numerals 14 and 16, are operatively connected to the tanks 12 by an inflow control device, generally indicated by the reference numeral 17. Each treatment unit 14 and 16 is comprised of a natural or synthetic liner 18 which fits the contour of a depression in perimeter dikes 19 and treatment unit bottom 21. Inside the liner is a system of perforated collection pipes 20 that conducts the treated effluent to a control box 22 via a connecting pipe 23, see FIG. 3. The control box 22 contains a "tower" of vertically spaced overflow T's 24 with caps 26 that can be used to control the level of water within the treatment unit 14 and constitutes a first outflow control device that is operatively connected to the distribution pipes of the polishing bed 16 via an outlet connecting pipe 25. A similar control box 22 is operatively connected to the collection pipes of the polishing bed 16 and constitutes part of a second outflow control device. The perforated collection pipes 20 are surrounded by a stone layer 28, typically using stones 2cm-5 cm in diameter. The stone drain layer 28 insures unrestricted entrance of the percolated wastewater effluent into pipes 20. Above the stone drain layer 28 is, preferably, a layer 30 of pea gravel with a particle diameter of 0.5 cm-1.0 cm. The pea gravel layer 30 supports a growth media 32 above and it insures that finer particles from the growth media 32 do not enter the stone drain layer 28 below. The pea gravel layer 30 is typically 5-10 cm in depth. The growth media 32 can be comprised of any number of substances including but not limited to coarse sand, peat mass, rock wool, coconut fiber, corn husks, rice shells, African palm shells, African palm fiber, sun flow seed pods, sun flower seed shells, coffee bean shells, shredded plastic, crushed glass, and a variety of other materials that possess desirable surface areas and hydraulic conductivity. Typically the growth media depth equals the plant root penetration depth (i.e. 60-80 cm). Near the top of the growth media 32 is a network distribution of perforated pipes 34. Spacing for the network of distribution pipe is generally half that of the network of collection pipes 20 (i.e. 1.5 m-2 m, and 3 m-4 m respectively). Each perforated distribution pipe 34 is surrounded by a zone 35 of stones 2 cm to 5 cm in diameter. This is generally the same size stone as that used in the stone drain layer 28. Each zone 35 is generally 0.5 m-1 m in width. This insures a uniform distribution of wastewater into the growth media 32. As with the collection pipes 20, the distribution pipes 34 are covered with a 5 cm-10 cm layer 36 of pea gravel with a particle diameter of 0.5 cm-1.0 cm. A 5 cm growth media layer 38 is used to cover the entire treatment unit 14. Selected plants 40 are then introduced into the growth media layers 32 and 38 in a manner that insures viable propagation for the species selected.

Plants with economic value are preferred because they can be harvested and sold (e.g. Giant Bulrush, Bamboo, Phragmites). Other plants can also be used for treatment and as animal forage (e.g. Reed Canary Grass). In some cases, the treatment vegetation selected can be used for human consumption (e.g. bamboo shoots, Sweet Basil, and rice).

Figure 5:
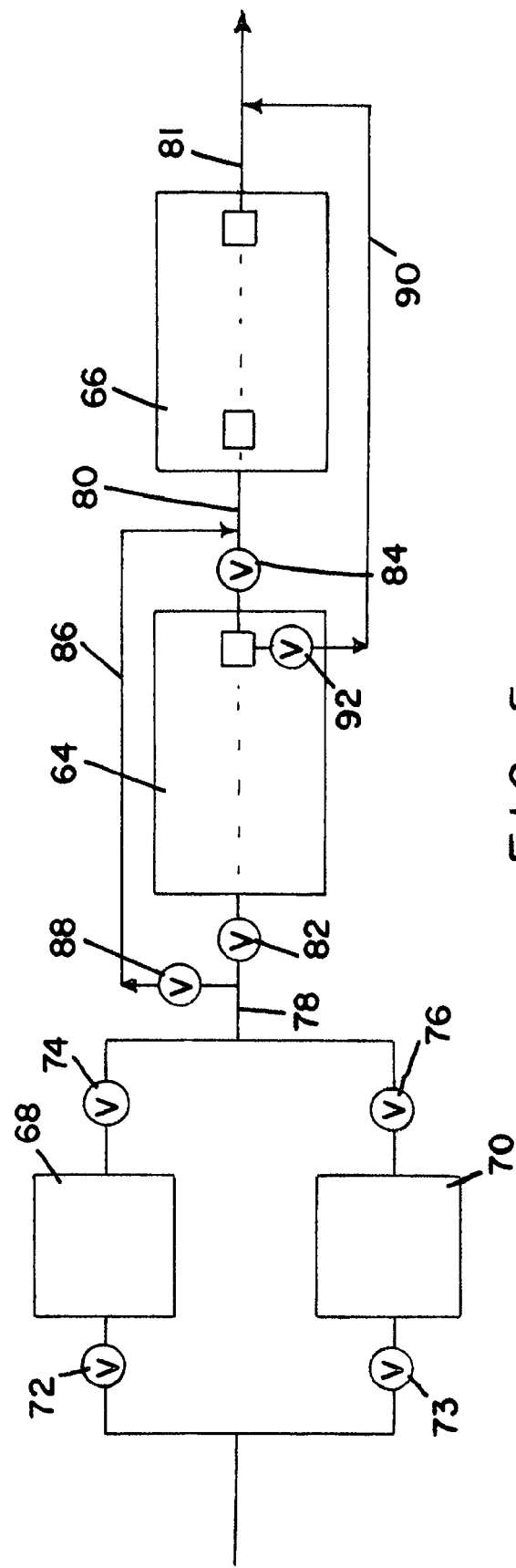
FIG. 5 illustrates parallel and series connection options for roughing treatment beds and polishing treatment beds.

The polishing bed 16 is normally constructed identical to the roughing bed 14, but for special applications, the growth media and plant species may be modified. The distribution pipes of the roughing bed 16 are typically connected directly to an outlet collecting pipe 25 of the control box 22 of the roughing bed 14. Under certain circumstances it may be desirable to construct the roughing bed 14 and the polishing bed 16 so that they can be operated in series or parallel. FIG. 5 illustrates the general piping and valving configuration for that option.

Referring to FIG. 5, there is shown a roughing bed 64 and a polishing bed 66 for receiving wastewater from a pair of parallel settling tanks 58 and 70. Valves 72 and 73 control flow of wastewater into the settling tanks 68 and 70, respectively to a pipe 78 that is connected to the roughing bed 64. A pipe 80 connects the control box of the roughing bed 64 to the polishing bed 66. A pipe 81 conducts the treated wastewater from the control box of the polishing bed 66. Flow of wastewater into the roughing bed 64 is controlled by a valve 82 in pipe 78. Pipe 80 contains a valve 84 for controlling flow of wastewater from the roughing bed 64 to the polishing bed 66.

A bypass pipe 86 operatively connects pipe 78 to pipe 80. A valve 88 in pipe 86 selectively directs flow of wastewater from pipe 70 to pipe 80. A second bypass pipe 90 connects the control box of the roughing bed 64 directly to pipe 81. A valve 84 is located in bypass pipe 90 for selectively controlling the flow of wastewater through the pipe 90.

In the series mode of operation valves 88 and 92 are closed and valves 82 and 84 are open. In the parallel made of operation, the valves 82, 88 and 92 are open and the valve 84 is closed.

Normally the roughing beds 14 and the polishing beds 16 are constructed in a way that provides equal surface area and depth. The surface area occupied by each treatment unit 14 and 16 is determined by several design equations unique to the treatment units of the present invention. A first order kinetic model is used to determine the required treatment time $$t = \frac{1}{k} \ln \frac{C_o}{C_t}$$

where:
t=treatment time (days)
k=kinetic rate constant (days$^{-1}$)
$C^0$=influent concentration (mg/L)
$C^1$=desired effluent concentration (mg/L)

Although the biochemical oxygen demand (BOD$_5$) is the basis for most treatment system designs, the same first order model can be used to determine treatment times for other wastewater parameters (e.g. COD, TOC, nutrients, heavy metals etc.). A kinetic rate constant of 1.2 days$^{-1}$ has been established for domestic wastewater BOD$_5$ reduction in a treatment system of the present invention, but the value can vary depending on climate (i.e. temperature ranges). Larger or smaller rate constants may be appropriate for other wastewaters like landfill leachate.

Based on the desired effluent concentration ($C_1$) and the strength of the influent ($C_0$) (Equation 1) can be solved for the needed detention time (typically in days).

Equation 2 is then used to determine the land area or treatment area needed.

$$Q \cdot t = L^2 \cdot f \quad \text{(Equation 2)}$$

where:
Q=design flow rate (L$^3$/d)
t=required treatment time (d)
L$^2$=required treatment system area (L$^2$)
H=treatment system depth (m)
f=growth media porosity (unitless but typically 0.35-0.40)

Because Q, t, H, and f are fixed by the wastewater flow, its constituents, and treatment system design parameters, (Equation 2) can be solved for the required treatment area (L$^2$). This area may range from several m$^2$ for a single family dwelling to hundreds of hectares for a large city. In most climates for domestic sewage an area of 2 m$^2$/capita is sufficient to reduce BOD$_5$ from 300 mg/l to less than 5 mg/l (i.e. a 98% reduction).

Figure 6:
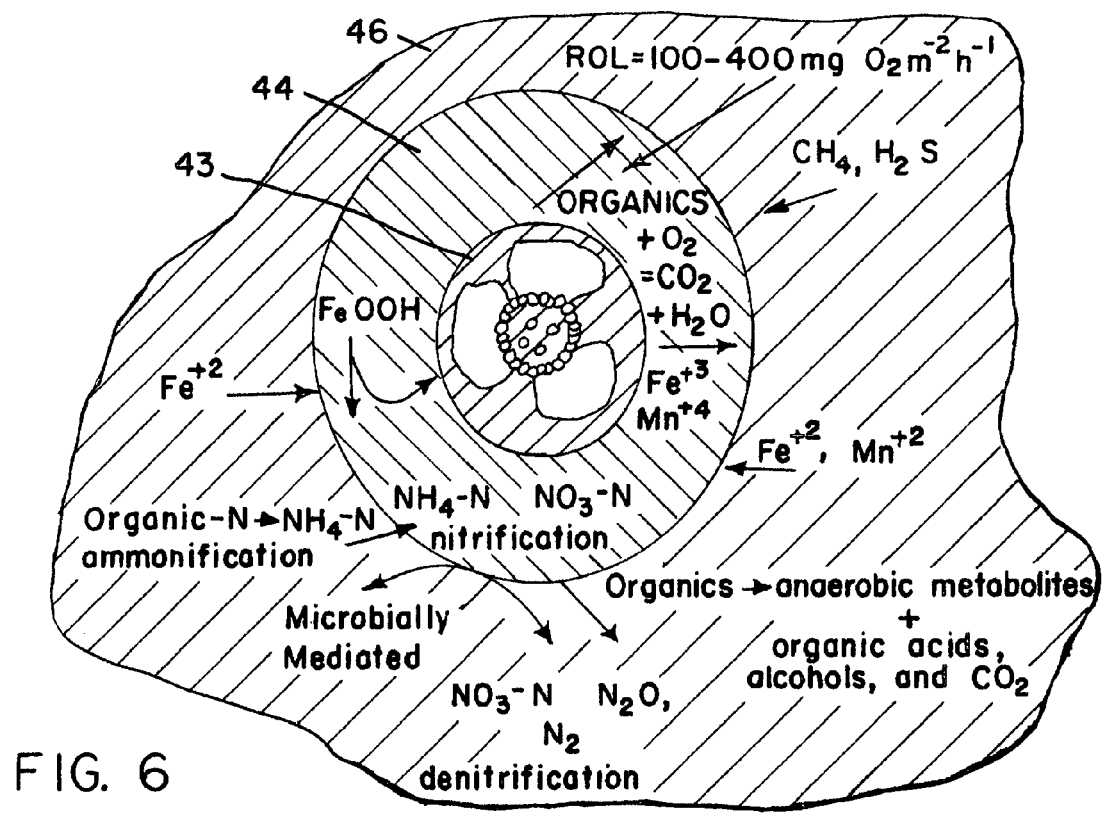
FIGS. 6 and 7 illustrates typical root cross section of the plants in the treatment beds of the present invention.
Figure 7:
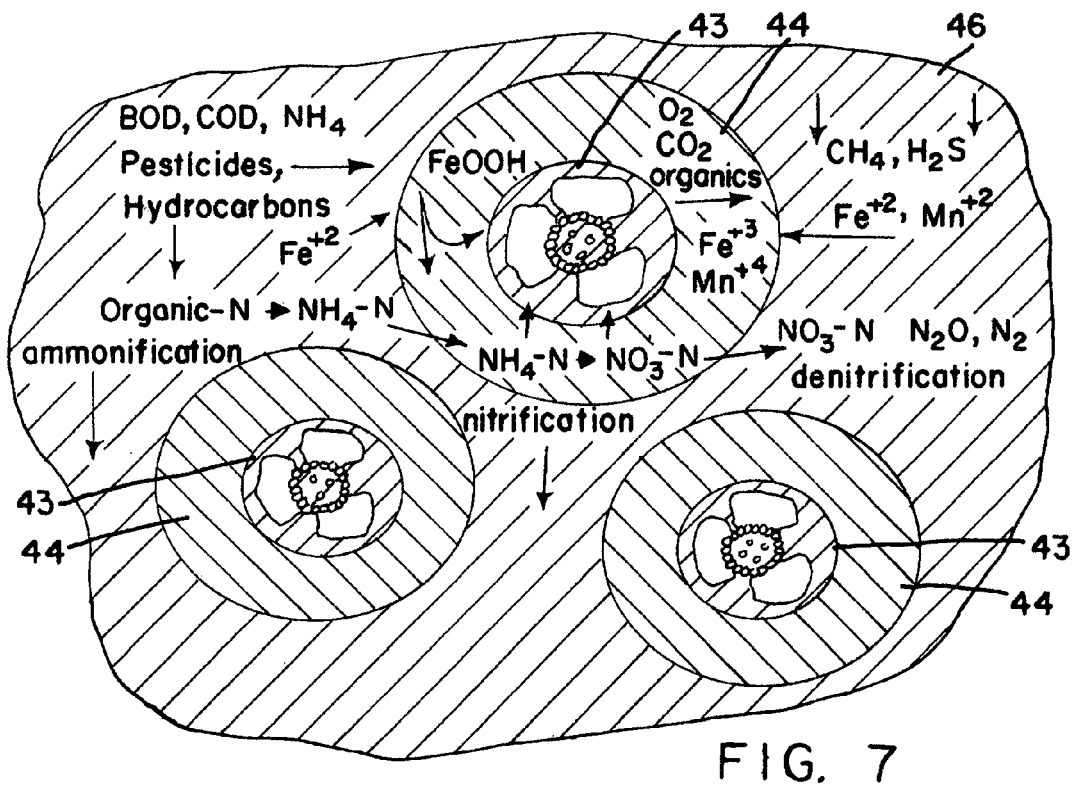

In addition to reducing the quantitative aspects of wastewater (e.g. BOD–CO$_2$+H$_2$O), treatment system units can also convert contaminant species from one form to another. This is primarily due to the unique array of aerobic and anaerobic microsites within the treatment unit. FIGS. 6 and 7 illustrate how oxygen rich zones around plant roots 43 and plant root hairs facilitate aerobic chemical and microbial processes in aerobic zone 44, while a short distance away in anaerobic zone 46, the growth media may be totally anaerobic with associated anaerobic processes occurring. As an example, nitrification of ammonia to nitrite and nitrate can occurs in the aerobic zone 44

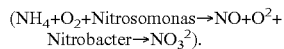
($NH_4+O_2$+Nitrosomonas→$NO+O^2$+
Nitrobacter→$NO_3^2$).

While denitrification of $NO_3^2$ to $N_2O$ and $N_2$ can be simultaneously occurring just a few mm away in the anaerobic zone 46

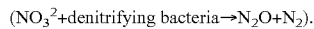
($NO_3^2$+denitrifying bacteria→$N_2O+N_2$).

Similar transformation processes can anaerobically convert organic ring compounds like benzene to straight chain hydrocarbons that are much easier for aerobic bacteria to convert into carbon dioxide and water.

Unlike conventional wastewater treatment systems, the apparatus of the present invention uses no chemicals, no motors, no electricity and it has no moving parts. It relies totally on the sun, gravity, wetland plants, bacteria, and a growth media to achieve the desired effluent quality. Because all of the treatment is accomplished below ground level, surface features are conducive to the creation of ecology parks, recreation areas, and self-educational nature trails. Although wastewater treatment is the primary objective, economic considerations usually include a selection of plants with resale value, and the production of clean water that can be reused for industrial processes, irrigation, aquaculture or even drinking. An additional benefit of "below ground" treatment is that the technology is much less sensitive to climatic difference than other systems. In northern climates when air temperatures drop to well below freezing, bacterial heat production in the growth media maintains an above freezing environment. The growth media itself also serves as insulation. In addition, to naturally occurring materials like coarse sand a wide variety of other media can be used effectively. These include but are not limited to, peat moss, rockwool, shredded plastics, crushed glass, coffee bean shells, rice shells, coconut fiber, corn husks, African palm shells, and the shells of sun flower seeds. Unlike other systems, the technology, also provides 100% treatment of the wastewater components. After separation of solids using conventional settling tanks, sludge residuals are removed and treated using "perpetual reed beds". The liquid fraction of the wastewater undergoes transformations in the roughing and polishing beds that include aerobic microbial breakdown near plant root surfaces and anaerobic microbial breakdown a short distance away from the roots (see FIGS. 6 and 7). Additionally, there are aerobic and anaerobic chemical processes occurring throughout the growth media matrix. Heavy metals are oxidized and precipitated while others "exchange" on growth media surfaces. Plants absorb wastewater nutrients and other organic materials. The media itself is an excellent sieve or filter, and typically reduces suspended solids concentrations to one or two mg/l. During summer months, the high rate of plant evapotranspiration can reduce effluent flows to near zero.

Figure 4:
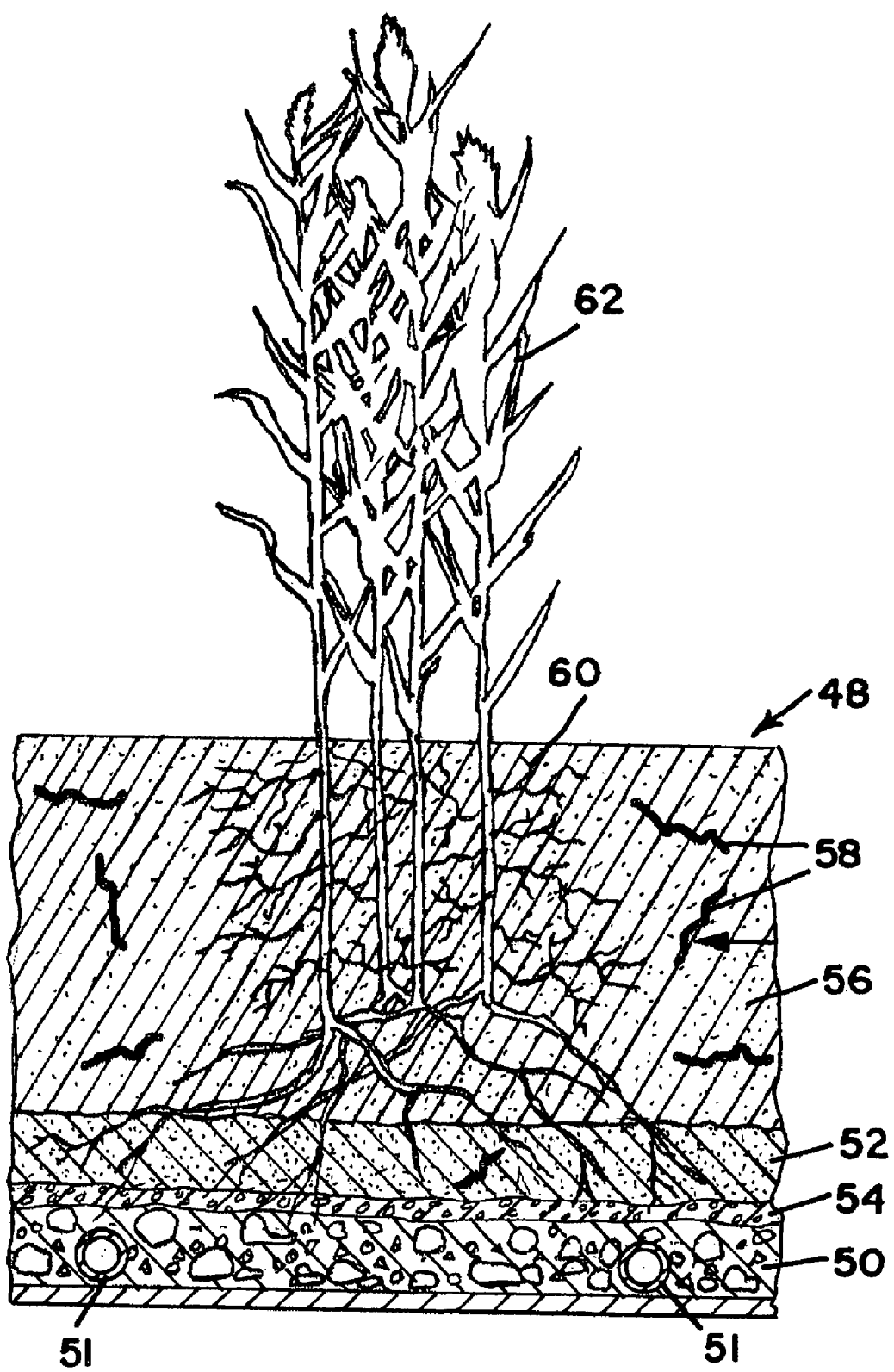
FIG. 4 is a vertical cross section of a typical "perpetual treatment bed" for sludge treatment and decomposition.

Referring to FIG. 4, sludge treatment is accomplished using a perpetual reed bed that relies on microbial decay and annelidic consumption (i.e. worms) to biodegrade the sludge at a rate essentially equal to that being applied. As such, there is not measurable accumulation of sludge within the treatment cells once the annelid population has established itself. The perpetual reed bed shown in FIG. 4 is generally indicated by the reference numeral 48 and includes a 15 to 20 cm base 50 of 2-5 cm drain stone. A 15-20 cm layer 52 of 1 mm-2 mm coarse sand is located above the base 50. A 5 cm layer 45 of 0.5-1 cm pea stone is located between layers 52 and base 50. Decades of stored sludge 56 is located above the layer 52 and contains worms 58 and the roots 60 of phragmites reeds 62. Perforated drain pipes 51 are located in the base 50 of drain stone.

A special application of the technology when used for landfill leachate treatment can include the combustion of waste methane gas to heat greenhouses that can be operated year round even in temperate climates. The use of this greenhouse gas (i.e. methane) to produce heat and carbon dioxide not only enhances leachate treatment and plant growth, but it also eliminates the large economic and environmental costs associated with trucking and treating leachate at municipal wastewater plants. When one considers that post landfill closure leachate treatment is usually required for 30-50 years, the economic savings are substantial.

In areas of the world where wastewater for irrigation is limited, the use of the treatment system of the present invention can greatly reduce the demand on potable water supplies by farmers. The extremely high quality effluent which can be controlled to retain its nutrients like nitrogen, phosphorus and potassium represents an excellent irrigation source. In other applications it can be recycled into municipal drinking water sources by percolation back into the groundwater. The extremely low concentration of suspended solids and turbidity make effluent from the treatment system of the present invention an excellent candidate for ultra violet disinfection, thereby reducing public health concerns regarding bacteria and virus contamination of groundwater. By eliminating the need for costly and "environmentally unfriendly" electricity, the technology also offers and excellent long-term solution for wastewater treatment in developing countries.

It is obvious that minor changes may be made in the form, construction and operation of the invention without departing from the material spirit thereof. It is not, however, desired to confine the invention to the exact form here in shown and described, but it is desired to include all such forms as intellectual property that come within the scope claimed.

This invention having been thus described, what is claimed as new and desired to secure by Letters Patent is:

1. Apparatus for treating wastewater comprising:
 (a) a wastewater supply source;
 (b) at least one treatment bed comprising:
  (1) a waterproof container having a bottom wall, side walls, and an open top;
  (2) a quantity of particulate material extending from said bottom wall to said open top and substantially filling said container;
  (3) a plurality of spaced perforated distribution pipes embedded in said particulate material adjacent said open top;
  (4) a plurality of spaced perforated collection pipes embedded in said particulate material adjacent said bottom wall and spaced from said distribution pipes;
 (c) an inflow control device operatively connecting said wastewater supply source to said distribution pipes so that said wastewater percolates through said particulate material to said collections pipes; and
 (d) an outflow control device operatively connected to said collection pipes for conveying percolated wastewater from said collection pipes out of said treatment bed, wherein said outflow control device includes a vertical flow control pipe operatively connected to said collection pipes, said vertical flow control pipe having a plurality of vertically spaced outlets that can be selectively opened and closed for controlling the level of wastewater in the treatment bed and thereby selectively controlling the treatment time of the wastewater passing through the treatment bed.

2. The apparatus as recited in claim 1, wherein said wastewater includes settleable solids and wherein said inflow control device comprises at least one settling tank for the separation of said settleable solids.

3. The apparatus as recited in claim 1, wherein said treatment bed is a roughing bed, said outflow control device is a first outflow control device and said apparatus further comprises a polishing bed that is substantially identical to said roughing bed, and a second outflow control device, said first outflow control device being operatively connected to the distribution pipes of said polishing bed and the collection pipes of said polishing bed operatively connected to said second outflow control device so that said roughing bed and said polishing bed are in series with respect to the flow of said wastewater.

4. The apparatus as recited in claim 3, wherein said inflow control device and said first and second outflow control devices include a plurality of bypass pipes and valves for selectively enabling said roughing bed and said polishing bed to be connected in series or in parallel with respect to the flow of said wastewater.

5. The apparatus as recited in claim 1, wherein said particulate material is suitable for a plant growth.

6. The apparatus as recited in claim 1, wherein said particulate material is of relatively small particle size and capable of supporting plant growth and microbial life and each of said collection pipes and said distribution pipes is surrounded by a zone of particulate material of relatively large particle size to prevent the perforations of said distribution pipes and said collection pipes from being clogged by said particulate material of relatively small particle size.

7. The apparatus as recited in claim 6, wherein said particulate material of relatively small particle size is coarse sand and said particulate material of relatively large particle is stone.

8. The apparatus as recited in claim 6, wherein the collection pipes are embedded in a layer of stones 2 cm to 5 cm in diameter said, said distribution pipes are surrounded by stones 2 cm to 5 cm in diameter, said particulate material of relatively small size is course sand and said coarse said is separated from said layer of stone by a layer of pea gravel 0.5 cm to 1.0 cm in diameter.

9. The apparatus as recited in claim 6, wherein said particulate material of relatively small particle size is peat moss.

10. The apparatus as recited in claim 6, wherein said particulate material of relatively small particle size is agricultural waste products.

11. The apparatus as recited in claim 1, wherein the vertical thickness of particulate material in said treatment bed is as from substantially 50 cm to substantially 100 cm.

12. The apparatus as recited in claim 1, wherein said distribution pipes and said collection pipes extend substantially the full length and width of said treatment bed.

13. The apparatus as recited in claim 1, wherein said particulate is suitable for plant growth and said apparatus further comprising wetland plants in said particulate material and which is capable of delivering oxygen to the particulate material for enabling aerobic bacteria to live in said particulate material in an area around the roots of said plants.

14. The apparatus as recited in claim 1, further comprising wetland plants capable of removing constituents including nutrients and heavy metals from the wastewater being treated.

15. The apparatus as recited in claim 1, wherein said treatment bed is a liner in a depression in the earth that forms a water impervious barrier between the particulate material and the earth.

16. Apparatus for treating wastewater comprising:
 (a) a wastewater supply source;
 (b) at least one treatment bed comprising:
  (1) a waterproof container having a bottom wall, said walls and an open top;
  (2) a layer of particulate material extending from said bottom wall to said open top;
 (c) an inflow distribution apparatus operatively connected to said wastewater supply source for distributing wastewater from said wastewater supply source at spaced points lengthwise and widthwise of the treatment bed at the upper end of said layer of particulate material to enable said wastewater to percolate downwardly through said layer of particulate material; and
 (d) an outflow collection apparatus for collecting said percolated wastewater at the bottom of said layer of particulate material and conveying said percolated wastewater out of said treatment bed,
wherein said outflow collection apparatus includes a vertical flow control pipe operatively connected to said outflow collection apparatus, said vertical flow control pipe having a plurality of vertically spaced outlets that can be selectively opened and closed for controlling the level of wastewater in the treatment bed and thereby selectively controlling the treatment time of the wastewater passing through the treatment bed.

17. The apparatus as recited in claim 16, wherein said outflow collection apparatus includes a control box in said treatment bed for controlling the level of wastewater in said treatment bed and thereby controlling the treatment time of the wastewater passing through the treatment bed.

18. The apparatus as recited in claim 16, wherein said particulate material is suitable for plant growth and said apparatus further comprising wetland plants in said particulate material and which are capable of delivering oxygen to the particulate material for enabling aerobic bacteria to live in said particulate material in an area around the roots of said plants.

* * * * *